United States Patent [19] Hardy

[11] 3,878,338
[45] Apr. 15, 1975

[54] TIME DIVISION MULTIPLEX TELECOMMUNICATIONS SYSTEMS

[75] Inventor: John Heskeith Martin Hardy, Ipswich, England

[73] Assignee: The Post Office, London, England

[22] Filed: Nov. 21, 1972

[21] Appl. No.: 308,551

[30] Foreign Application Priority Data
Nov. 25, 1971 United Kingdom ............... 54739/71

[52] U.S. Cl. ............................................ 179/15 AT
[51] Int. Cl. ............................................. H04j 3/00
[58] Field of Search ....... 179/15 AT, 15 AQ, 15 BY

[56] References Cited

UNITED STATES PATENTS

| | | | |
|---|---|---|---|
| 3,597,548 | 8/1971 | Drinnan | 179/15 AT |
| 3,639,693 | 2/1972 | Bartlett | 179/15 AT |
| 3,736,381 | 5/1973 | Johnson | 179/15 AT |

FOREIGN PATENTS OR APPLICATIONS

| | | | |
|---|---|---|---|
| 41-6376 | 4/1966 | Japan | 179/15 AQ |

*Primary Examiner*—Ralph D. Blakeslee
*Attorney, Agent, or Firm*—Hall & Houghton

[57] ABSTRACT

A digital switching network employing pulse code modulation (p.c.m.) for conveying information, for use in time division multiplex (t.d.m.) telecommunications systems. The receive portions of $n_1$ p.c.m. systems are applied as inputs to a scanning matrix with each system having been delayed by one bit more than the previous system. The output of the scanning matrix (comprising separate wires on which are read out, at any instant, a different digit from each of the $n_1$ systems) is written into a random access memory that is one which has a unique storage location for each digit of the $n_1$ systems). The output of this memory is interconnectible through t.d.m. connection means with a second random access memory, there being read-out (in parallel) from the first memory and written (in parallel) into the second memory at any instant all of the digits of a channel of one of the p.c.m. systems. The output of the second memory is applied to a second scanning matrix the outputs of which are connected to the send portions of $n_2$ p.c.m. systems. At any instant, there are read out from the second memory, on separate wires, a different digit of each of the $n_2$ systems, and on each output of the second scanning matrix there are read-out (in series) the digits of each channel of a respective p.c.m. system. The outputs of the second scanning matrix include delays applied in the reverse order to the delays in the inputs of the first-mentioned scanning matrix.

25 Claims, 11 Drawing Figures

TIME DIVISION MULTIPLEX TELECOMMUNICATIONS SYSTEMS

Figure 1:
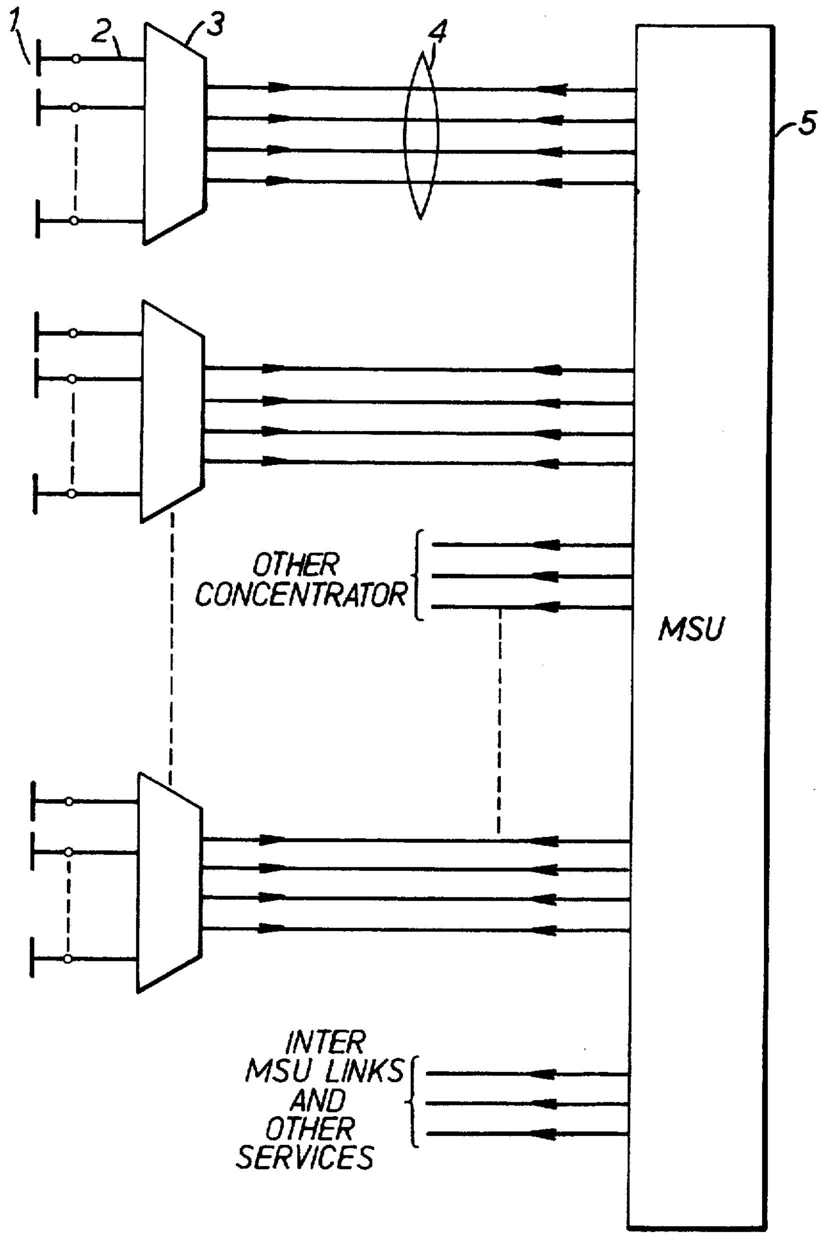

This invention relates to time division multiplex (t.d.m.) telecommunications systems, with particular reference to digital switching systems, employing pulse code modulation (p.c.m.) for conveying information, and it will be described in relation thereto.

The object of the invention is the provision of an integrated p.c.m. system for the transmission and switching of digital information, thereby making unnecessary any intermediate demodulation-remodulation sequence.

It should be understood that the information to be transmitted may originate in the form of either speech or data in any form.

The present invention provides a digital switching network comprising at least one first storage means having a plurality of inputs which are the receive portions of respective p.c.m. systems, the first storage means being operable to store, in parallel, the serial digits of each channel of said p.c.m. systems; at least one second storage means having a plurality of outputs which are the send portions of respective p.c.m. systems; t.d.m. connection means for interconnecting outputs of the first storage means with inputs of the second storage means, and control means operable to establish a desired connection between an input channel of the first storage means and an output channel of the second storage means by: reading-out, in parallel, from said first storage means, the digits of said input channel at a time allocated by said t.d.m. connection means; writing-in said readout, in parallel, into the second storage means at the said allocated time, and serially reading-out to said output channel the parallel-stored digits of said input channel from the second storage means.

In an embodiment of the invention there are at least one pair of first storage means the outputs of which are common and at least one pair of second storage means the inputs of which are common.

The control means may include a common control connected to receive information from any input channel of first storage means relating to a desired connection to be established between that input channel and an output channel of second storage means. The control means may then also include a call set-up unit operable to test for the existence of a free input channel in conjunction with the existence of a free output channel necessary to establish the said desired connection, and then to apply addresses to the first and second storage means to read-out from first storage means the digits of said free input channel and to write-in said readout into second storage means.

In embodiments of the invention described herein, the control means includes, for the first and second storage means at least one respective information address memory, in bothway communication with the common control, for storing the address of each operational location of the storage means. The control means also includes, for the first storage means, at least one state of channel memory, in bothway communication with the common control, for storing the state of each input channel of the first storage means, and, for the second storage means, at least one state of channel memory, in bothway communication with the common control, for storing the state of each output channel of the second storage means. In addition, the control means includes, for the second storage means, at least one second address memory, in both way communication with the common control, for receiving information relating to the interconnections required between outputs of the first storage means and inputs of the second storage means to establish a desired connection between an input channel and an output channel.

Figure 2:
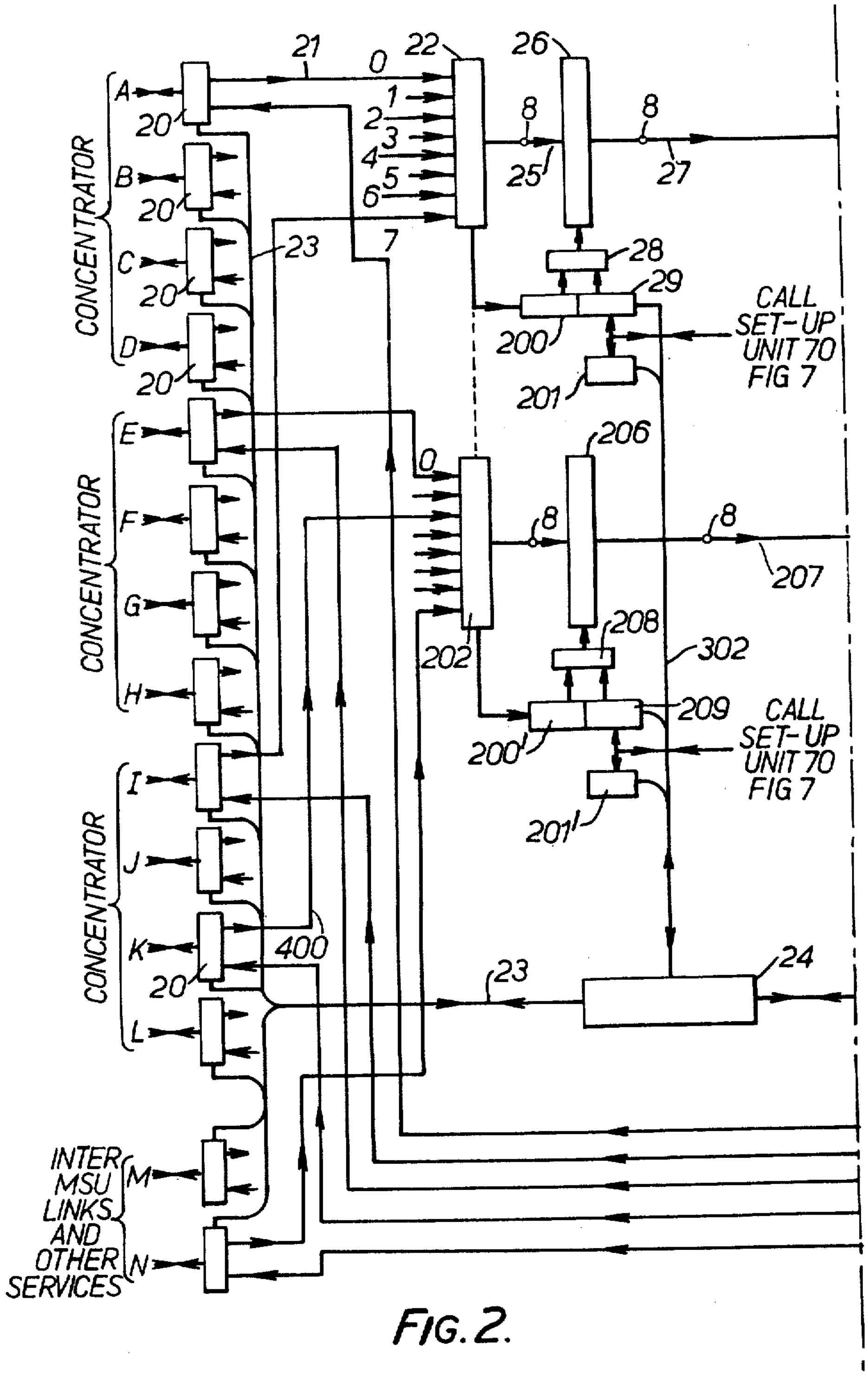
Figure 3:
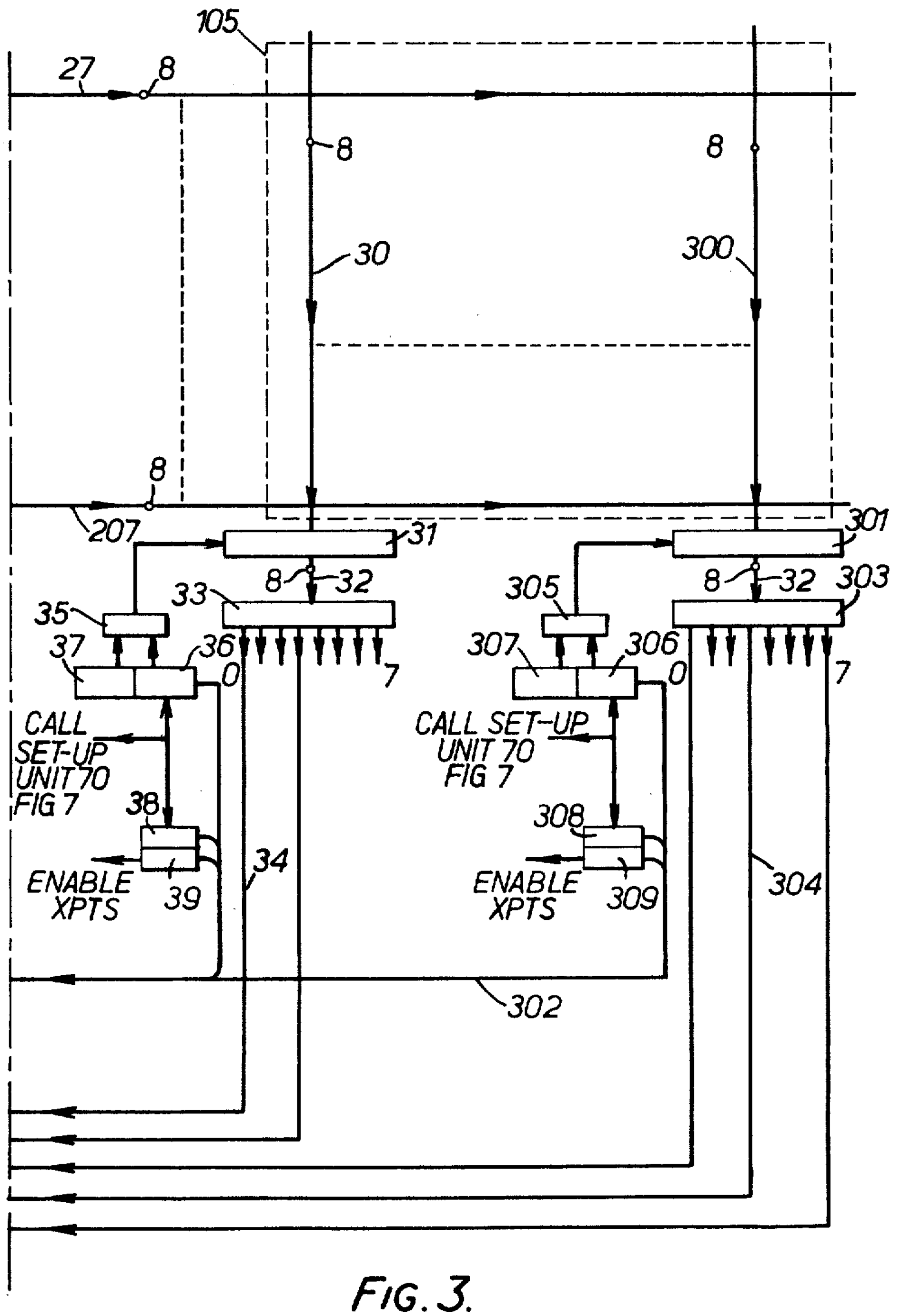
Figure 4:
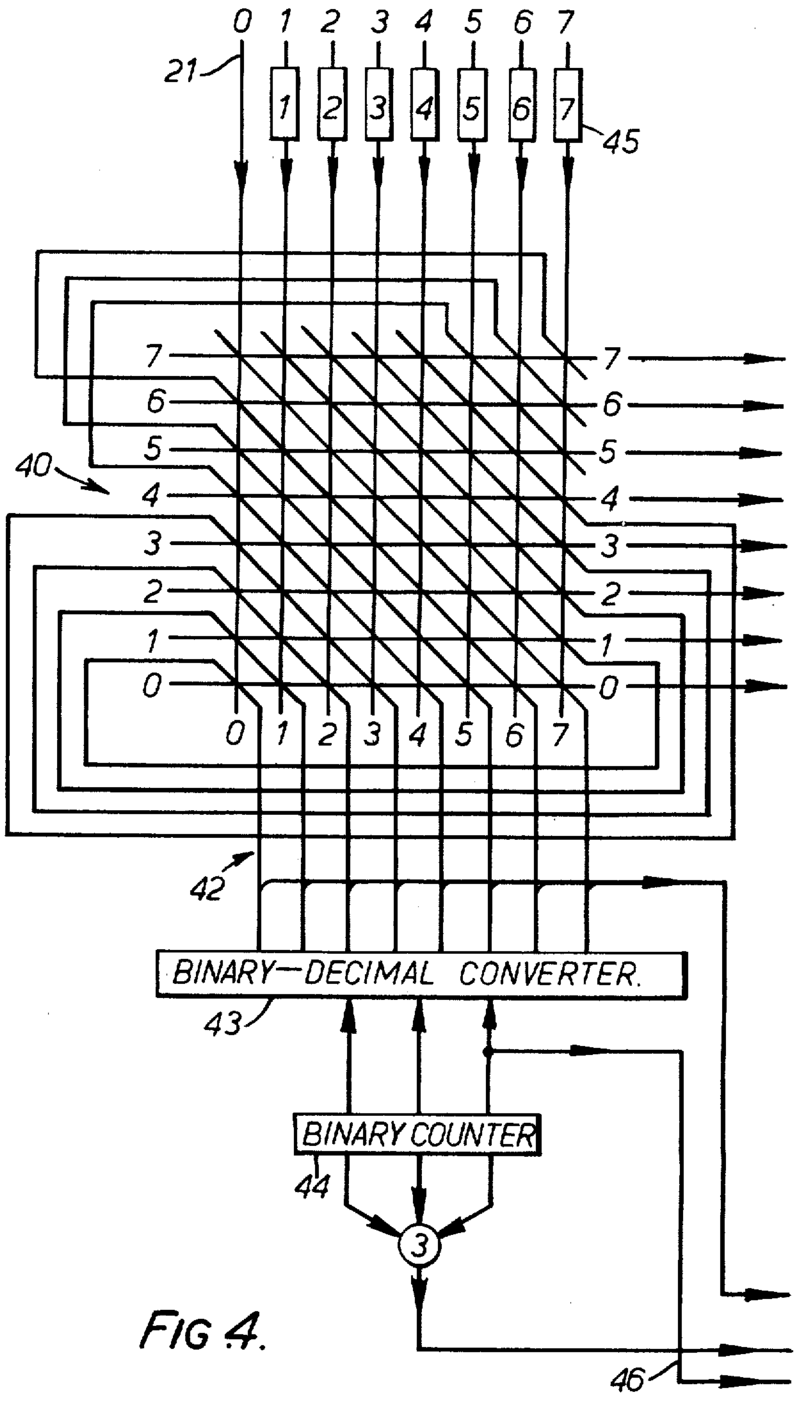
Figure 5:
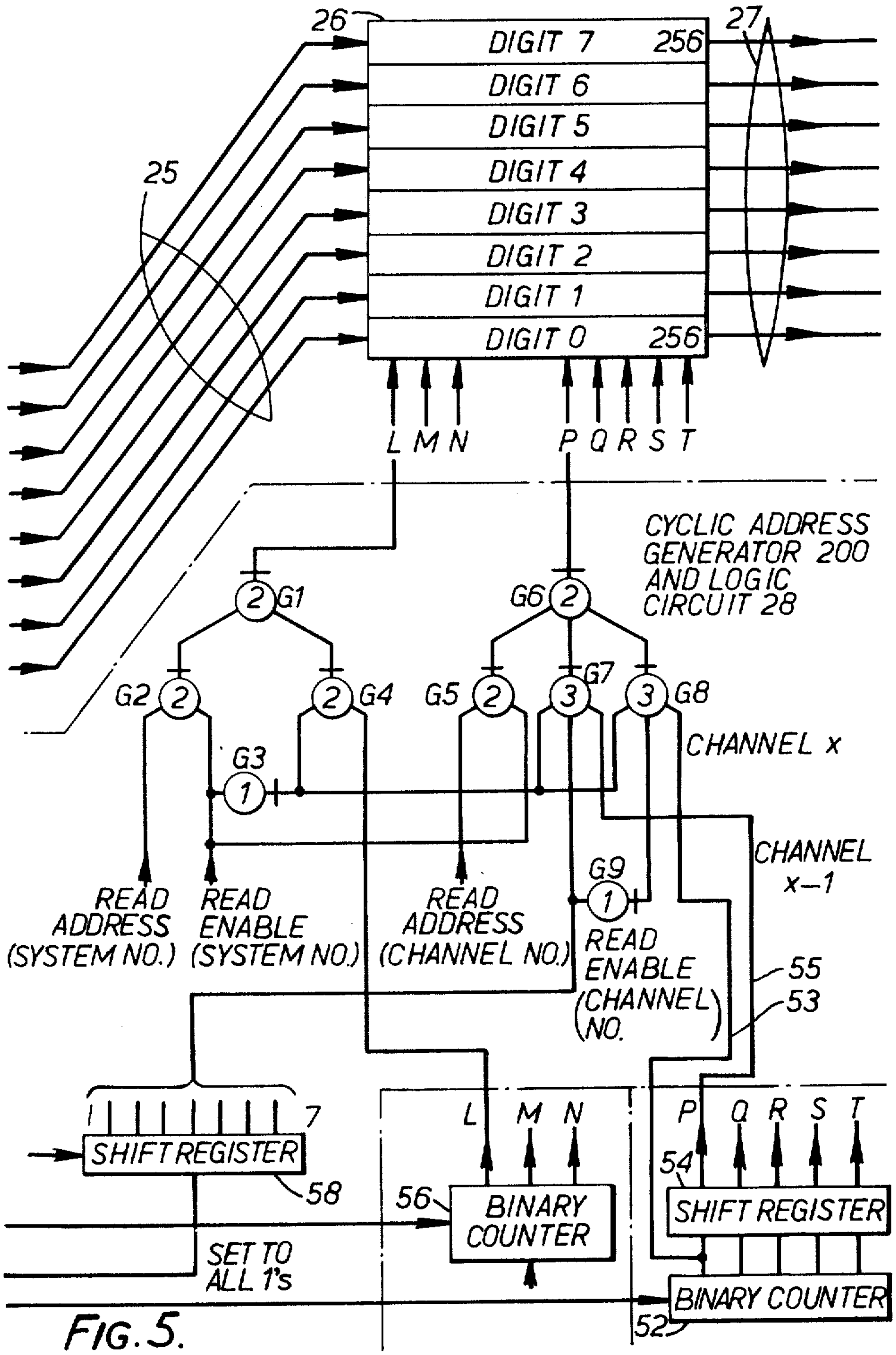
Figure 6:
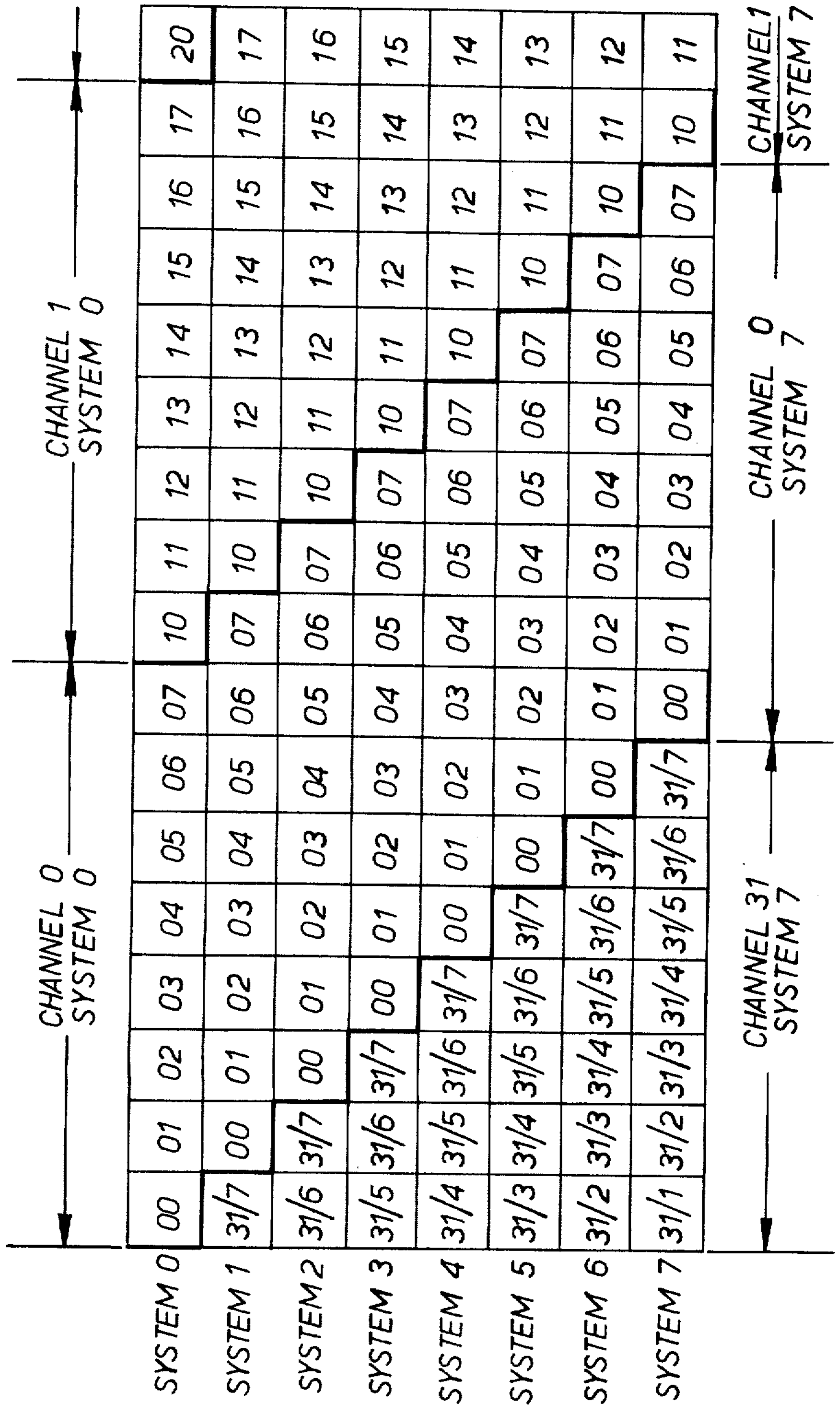
Figure 7:
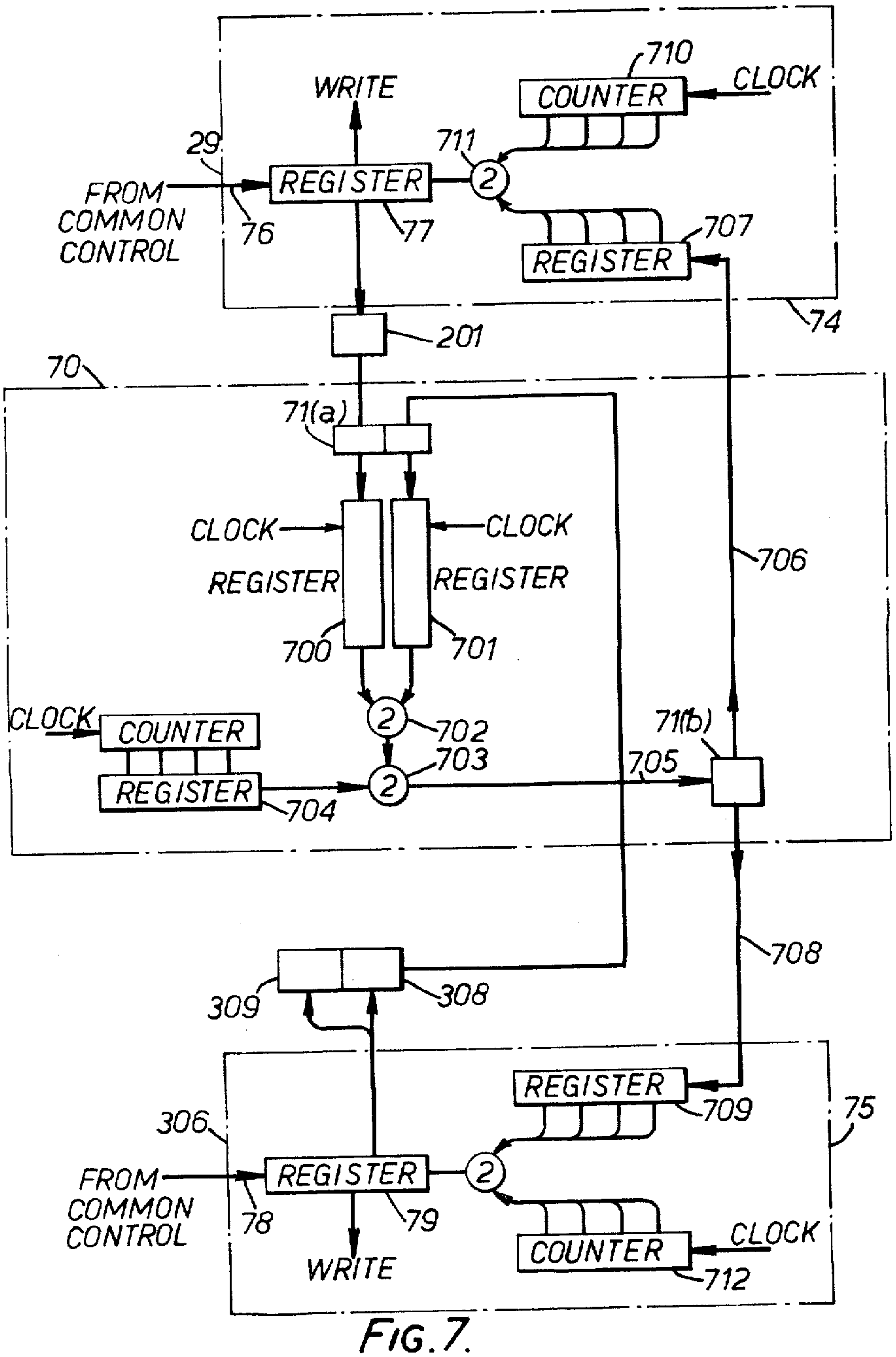
Figure 8:
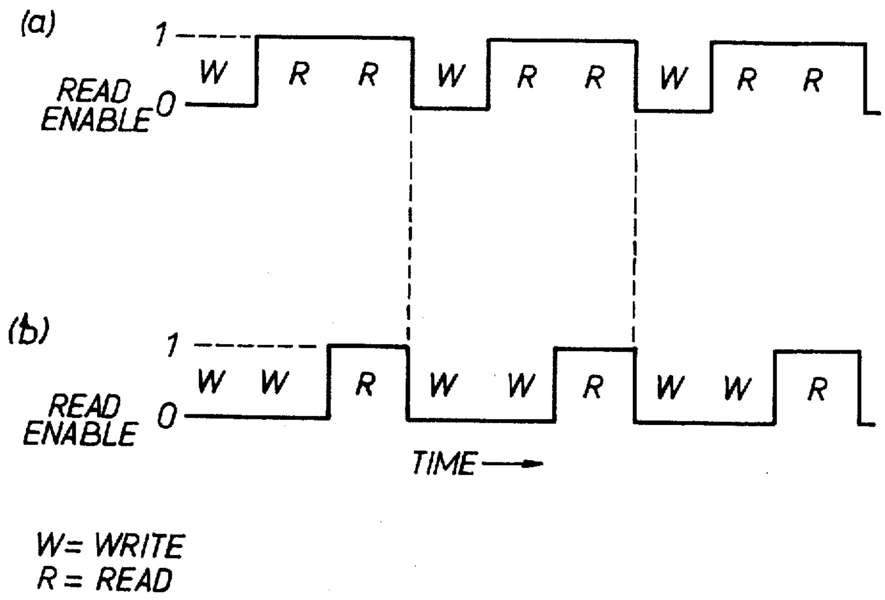
Figure 9:
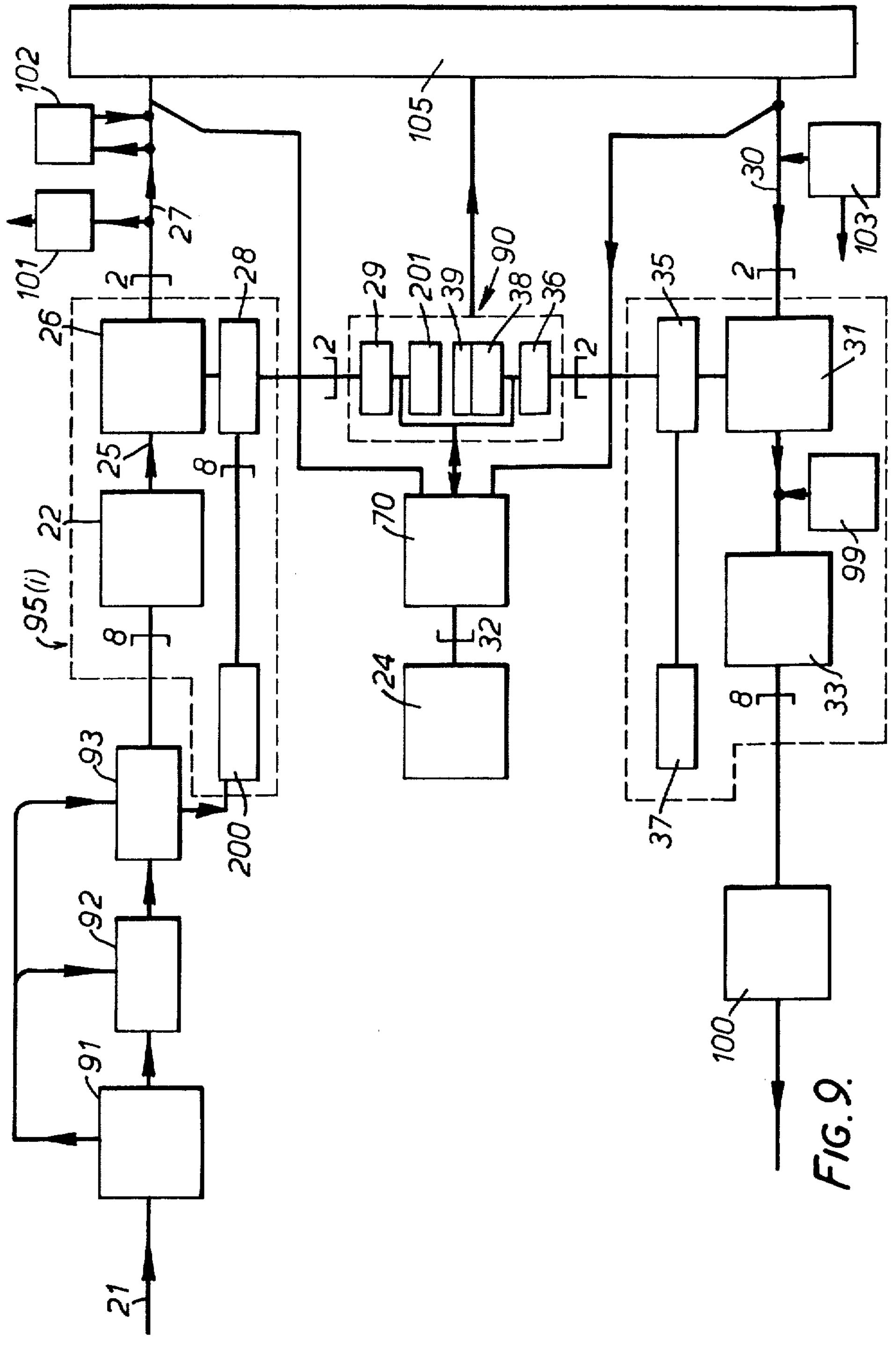
Figure 10:
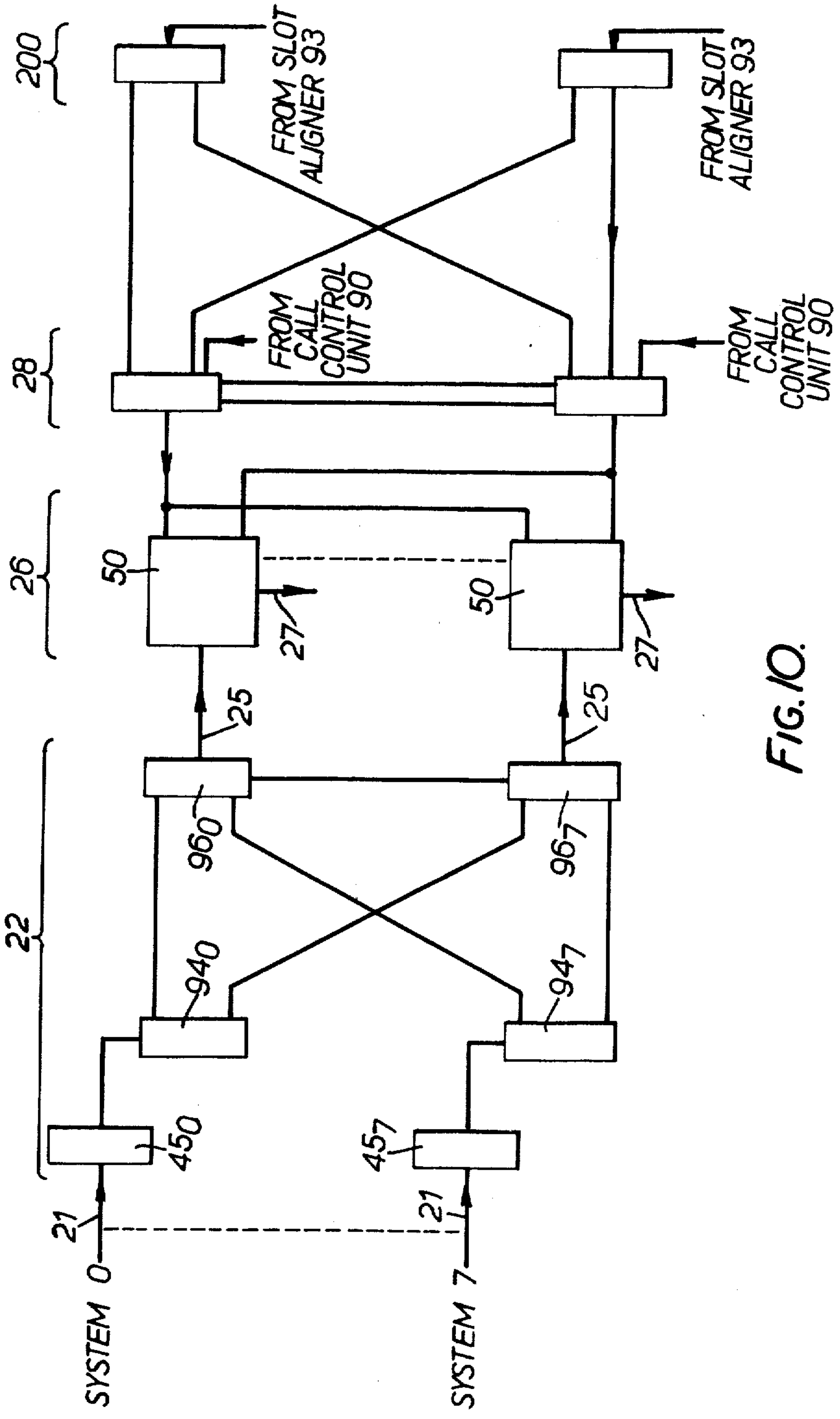
Figure 11:
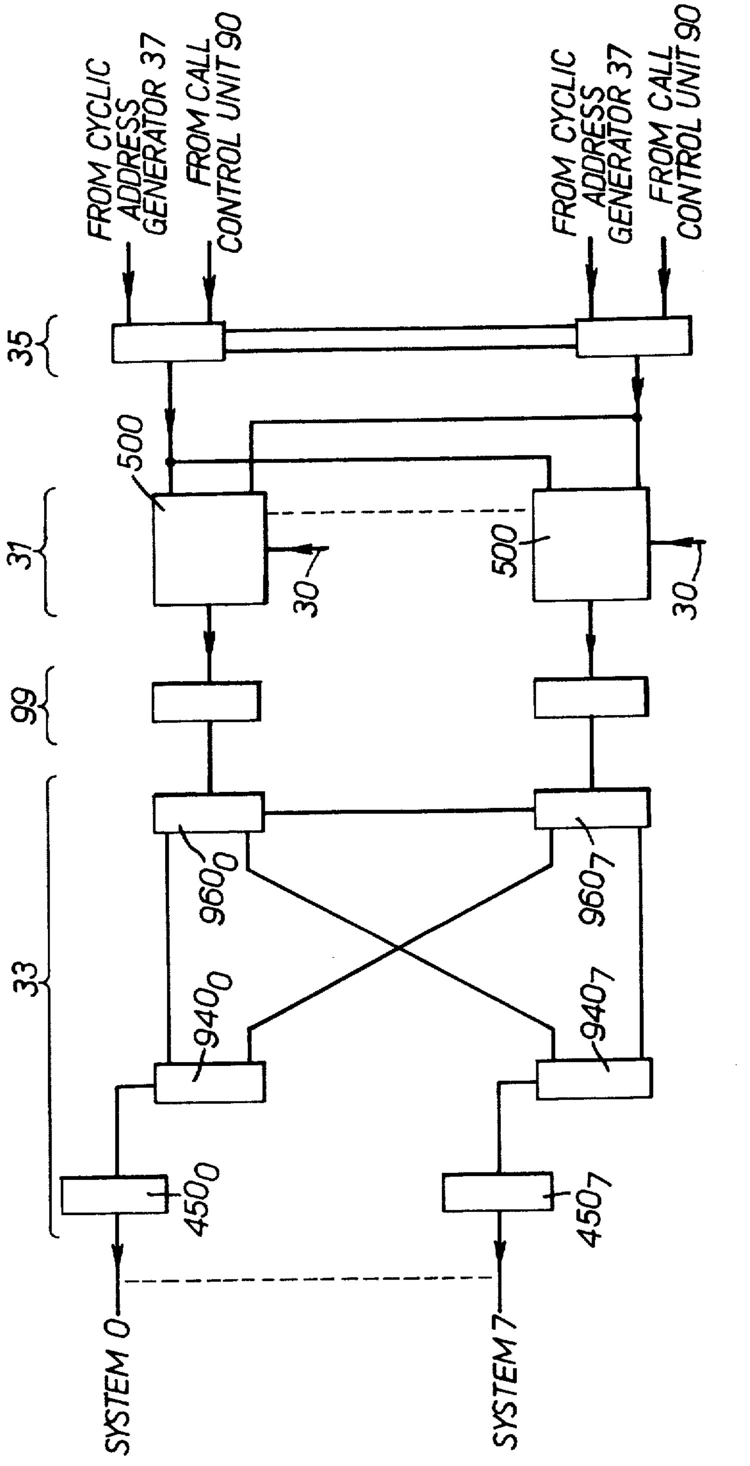

By way of example only, embodiments of the invention will now be described with reference to the accompanying drawings in which:

FIG. 1 is a block schematic diagram of a telephone exchange system embodying the invention, FIGS. 2 and 3 fit together, and show a block schematic diagram of the MAIN SWITCHING UNIT depicted in FIG. 1, FIGS. 4 and 5 fit together, and shown in more detail the operation of the RECEIVE CONVERSION UNIT and RECEIVE DIGITS STORE shown in FIGS. 2 and 3, FIG. 6 is a timing chart of the input p.c.m. systems within the SCANNING MATRIX shown in FIG. 4, FIG. 7 is a block schematic diagram of a CALL SET-UP UNIT associated with the MAIN SWITCHING UNIT shown in FIGS. 2 and 3, FIG. 8 shows the READ ENABLE waveforms used in connection with the WRITING and READING process, FIG. 9 is a block schematic diagram of another form of MAIN SWITCHING UNIT, and FIGS. 10 and 11 show, in greater detail, a RECEIVE MODULE and a SEND MODULE respectively of FIG. 9.

The telephone exchange system depicted in FIG. 1 comprises a concentrator arrangement, in which the subscribers 1 are formed into groups, of say 1000, each subscriber of a group being connected by an individual local pair 2, to a CONCENTRATOR 3, which in turn is connected by a number of p.c.m. systems 4 to a MAIN SWITCHING UNIT (MSU) 5, which makes provision for connecting together any two subscribers, or connecting a subscriber to another MSU (not shown) via an inter-MSU link, or to other circuits, such as trunks, operator etc.

It is convenient at this stage to explain what is to be understood by certain terminology used in the explanation of the embodiment.

A p.c.m. system is typically made up of 32 channels (0–31) each channel formed by a time slot. The sampling rate is taken to be 8 kHz, thereby giving the 32 time slots an occupancy of 125 micro-seconds, this period being termed a frame. Each slot is 8-bit coded, i.e. 8 binary digits. Two of the channels, namely 0 and 16, are used for signalling, the remaining 30 channels being used for information, which may originate as speech or data.

Each p.c.m. system is carried on a time division multiplex (t.d.m.) circuit comprising two 2-wire highways (HW) designated as RECEIVE or SEND, in accordance with the direction of transmission relative to the MSU.

Operation of the MSU will now be described with reference to FIGS. 2 and 3 in which a plurality of p.c.m. systems A to N are shown connected to the MSU.

Each of the p.c.m. systems A to N is terminated in the MSU on a respective SYSTEM CONTROL 20 as shown in FIG. 2. The output of each SYSTEM CONTROL 20 is a respective 2-wire RECEIVE HW 21 which is connected as one input to one of two RE- CEIVE CONVERSION UNITS 22, 202. Each SYSTEM CONTROL 20 is also connected by a bothway circuit 23 with a COMMON CONTROL 24 the function of which will be described below. Each of the RECEIVE CONVERSION UNITS 22, 202 has provision for eight of the 2-wire RECEIVE HW's 21 (designated 0–7) to be connected to it, and it is for this reason that two such UNITS are shown in FIG. 2. In general, the number of RECEIVE CONVERSION UNITS required will depend on the total number of p.c.m. systems terminating at the MSU. The 2-wire RECEIVE HW's 21 of the incoming p.c.m. systems A to N are not distributed in strict rotation as input to RECEIVE CONVERSION UNIT 22, 202 as a matter of security.

Each RECEIVE CONVERSION UNIT 22, 202 caters for a total of 256 input channels, and its purpose is to convert the serially-disposed 8 digits of each channel into parallel form on eight outputs. The output 25 of each RECEIVE CONVERSION UNIT 22, 202 (comprising the eight outputs 25) is connected as input to a respective RECEIVE DIGITS STORE 26, 206 comprising 8 parallel stores one for each store of the digits and each having a capacity of 256 bits. The output of each RECEIVE DIGIT STORE 26, 206 comprises eight paths in parallel and is referred to as a READ PARALLEL HIGHWAY (HW) 27, 207 respectively. The two READ PARALLEL HW's 27, 207 are cross connected with two similar eight-path WRITE PARALLEL HW's 30, 300 (FIG. 3) in t.d.m. connection means comprising a space switch 105 and each WRITE PARALLEL HW 30, 300 is connected as input to a respective SEND DIGITS STORE 31, 301 similar to RECEIVE DIGITS STORE and having a capacity for 256 bits in each of eight parallel stores. Each SEND DIGIT STORE 31, 301 has an output of eight paths 32, one for each of the eight digits connected as input to a respective SEND CONVERSION UNIT 33, 303 having eight outputs, each of which is a 2-wire SEND HW connected to a respective one of the SYSTEM CONTROL 20, in FIGS. 2 and 3 for example one of the SEND HW's carries the reference 34 and is shown connected to SYSTEM CONTROL 20 of the p.c.m. system A.

The purpose of a SEND CONVERSION UNIT 33, 303 is to convert a parallel-stored 8-bit code into a serial code on a 2-wire SEND HW.

Each RECEIVE DIGITS STORE 26, 206 is associated with a LOGIC CIRCUIT 28, 208; INFORMATION ADDRESS MEMORY 29, 209; eight ADDRESS GENERATORS 200, 200' (one for each digit of the RECEIVE DIGITS STORE) and a STATE OF CHANNEL MEMORY 201, 201'.

Similarly, each SEND DIGITS STORE 31, 301 is associated with a LOGIC CIRCUIT 35, 305; INFORMATION ADDRESS MEMORY 36, 306; ADDRESS GENERATORS 37, 307 and STATE OF CHANNEL MEMORY 38, 308.

In addition each SEND DIGITS STORE 31, 301 has a CROSS POINT (XPT.) ADDRESS MEMORY 39, 309.

The INFORMATION ADDRESS MEMORIES and STATE OF CHANNEL MEMORIES of both the RECEIVE and SEND DIGITS STORES, and the XPT. ADDRESS MEMORIES of the SEND DIGITS STORE are in bothway communication with a COMMON CONTROL 24, by means of paths 302.

SET-UP CONNECTION

The set-up of a connection between, say, calling channel $x$ of p.c.m. system A, and a called channel of p.c.m. system K (which connection is designated by COMMON CONTROL 24 as a result of information received from channel $x$ will now be described System A terminates in SYSTEM CONTROL 20, and the information from the calling channel $x$ is conveyed by bothway path 23 to the COMMON CONTROL 24.

The 2-wire RECEIVE HW 21 of system A terminates as input O, together with similar inputs 1–7, on RECEIVE CONVERSION UNIT 22. Within this unit the eight input systems, each of 32 serial 8-bit channels are scanned in such a way that the contents of each channel is written in parallel on eight paths 25 into the RECEIVE DIGITS STORE 26, at locations corresponding to their system and channel number. This process is termed "cyclic writing".

The addresses of all locations in the RECEIVE DIGITS STORE 26 that are currently carrying traffic, are also stored in the INFORMATION ADDRESS MEMORY 29 associated with it, and which is in bothway communication with the COMMON CONTROL 24.

COMMON CONTROL 24, having been instructed by the calling channel $x$ of system A that a connection is required to a called destination reached over system K, will find a free channel $y$ in system K over which the required connection can be set-up, and will ascertain which SEND CONVERSION UNIT provides access to system K : in FIG. 3 it is SEND CONVERSION UNIT 303 and its output 2-wire SEND HW 304 which provide access to system K. COMMON CONTROL 24 must also ascertain the RECEIVE and SEND CONVERSION UNITS involved in the other direction, i.e. called channel to calling channel. In FIG. 3 system K has access by 2-wire RECEIVE HW 400 to RECEIVE CONVERSION UNIT 202, and SEND CONVERSION UNIT 33 has access, over 2-wire SEND HW 34, to system A.

The COMMON CONTROL 24, over the paths 302, will store the address of the calling channel in INFORMATION ADDRESS MEMORIES 29 on the RECEIVE side, and 36 on the SEND side, and the addresses of the called channel in INFORMATION ADDRESS MEMORIES 209 on the RECEIVE side, and 306 on the SEND side.

In order to set-up a bothway connection, the COMMON CONTROL 24 must find two common channels, in the PARALLEL HW's, one that is free both in the READ PARALLEL HW of the calling channel, and in a WRITE PARALLEL HW leading to the required called destination, and another that is free in the READ PARALLEL HW of the called destination and in a WRITE PARALLEL HW leading to the calling channel, i.e. in the connection being set-up from calling channel $x$ of system A to called channel $y$ of system K, the first channel must be free in both t.d.m. READ PARALLEL HW 27 and in t.d.m. WRITE PARALLEL HW 300, and the second channel must be free in both t.d.m. READ PARALLEL HW 207 and in t.d.m. WRITE PARALLEL HW 30.

COMMON CONTROL 24 tests in co-operation with a CALL SET-UP UNIT 70 (FIG. 7), for the two common channels, by application over the paths 302, to STATE OF CHANNEL MEMORIES, 201 for RE- CEIVE DIGITS STORE 26; 308 for SEND DIGITS STORE 301; 201' for RECEIVE DIGITS STORE 206, and 38 for SEND DIGITS STORE 31.

The CALL SET-UP UNIT 70 is described in more detail later with reference to FIG. 7.

Having selected the channels, COMMON CONTROL 24 instructs each of the XPT. ADDRESS MEMORIES 39 and 309 as to which crosspoints of the space switch 105 must be operated, and at what time, and instructs INFORMATION ADDRESS MEMORIES 29, 306, and 209, 36.

The calling channel information is read-out of the RECEIVE DIGITS STORE 26 in parallel on to the t.d.m. READ PARALLEL HW 27. This is termed 'acyclic reading'.

The information is cross-connected, by reason of the operated crosspoints, to t.d.m. WRITE PARALLEL HW 300 and written-in to SEND DIGITS STORE 301, where it is stored in parallel. This is termed 'acyclic writing'.

By means of SEND CONVERSION UNIT 303, the information is read-out from SEND DIGITS STORE 301 and transmitted serially on 2-wire SEND HW 304 to the SYSTEM CONTROL 20 of system K. This is termed 'cyclic reading'.

A similar sequence of events takes place, in the other direction, when channel y of system K is originating information, involving the following components: SYSTEM CONTROL 20 of system K; RECEIVE HW 400; RECEIVE CONVERSION UNIT 202; RECEIVE DIGITS STORE 206; READ PARALLEL HW 207; WRITE PARALLEL HW 30, SEND DIGITS STORE 31, SEND CONVERSION UNIT 33, and 2-wire SEND HW 34 to SYSTEM CONTROL 20 of system A.

The arrangement shown in FIGS. 2 and 3 will now be described in more detail with reference to FIGS. 4 and 5.

A RECEIVE CONVERSION UNIT, such as 22 of FIG. 2, comprises an 8 × 8 SCANNING MATRIX (or series/parallel conversion means) 40, in which each vertical 0–7 is a 2-wire, 32 channel p.c.m. RECEIVE HW 21, and each horizontal 0–7 is an output to a different one of the DIGIT STORES 0–7 of RECEIVE DIGITS STORE 26. The 'enable' inputs 42 of the SCANNING MATRIX 40 are connected diagonally to eight scan outputs of a SCAN GENERATOR comprising BINARY-DECIMAL CONVERTER 43, driven by a 3-bit BINARY COUNTER 44, driven at 2.048 M Hz.

The 4-wire p.c.m. systems enter the MAIN SWITCHING UNIT in frame alignment, and then the 2-wire RECEIVE HW's 1–7 are re-timed, each being delayed by 1-bit (488 nS) more than the previous system, by means of DELAY UNITS 45, before being applied to the SCANNING MATRIX 40. This allows the scanning process to extract the serial 8-bit coded content of each channel of each of the eight systems, on to eight parallel outputs 25 (one for each of the digits 0–7) and write them into the RECEIVE DIGITS STORE 26, at a location corresponding to the system and channel number of the digit, each of the digit stores having a capacity of 256 bits. The RECEIVE DIGITS STORE 26 constitutes a random access memory having a unique storage location for each of the 256 digits of the eight p.c.m. systems, thereby providing full availability.

The timing of the serial digits of the input systems within the SCANNING MATRIX 40, is illustrated in the chart shown in FIG. 6, from which it can be seen that at any instant in time, the eight parallel outputs refer to a different digit from each of the p.c.m. systems, and that the bit outputs of some systems refer to one channel, while the bit outputs of the other systems refer to a different channel, with the exception of every 1 in 8 bit times, when all outputs refer to the same channel. If the chart is examined from system 0 down to system 7 for any instant of time, it is seen that for 7 out of 8 bits, one or more systems refer to channel $x$, and the remainder to channel $x$-1.

The 256 K Hz output 46 of BINARY COUNTER 44 is used to drive a CHANNEL NUMBER GENERATOR 52 of the ADDRESS GENERATOR 200 CHANNEL NUMBER GENERATOR 52 is a 5-bit BINARY COUNTER the outputs 53 of which each correspond to a channel number $x$, and are fed into a gate G8 of the LOGIC CIRCUIT 28, and into parallel input SHIFT REGISTER 54, the outputs 55 of which are fed into gate G7 of the LOGIC CIRCUIT 28 and correspond in each case to a channel number one less than the corresponding output of BINARY COUNTER 52, i.e. channel $x$-1.

BINARY COUNTER 52 thus provides channel $x$ outputs, and SHIFT REGISTER 54 provides channel $x$-1 outputs.

The selection of channel number $x$ or $x$-1 for a particular DIGITS STORE is determined by the outputs of 7-bit SHIFT REGISTER 58 which are applied to the second enable input of channel member gates G7 and G8. The SHIFT REGISTER 58 is set to 'all 1's' by a synchronising pulse from the output of the BINARY COUNTER 44.

The system number for each DIGIT STORE 0–7 of RECEIVE DIGITS STORE 26, is generated by a 3-bit BINARY COUNTER 56 of the ADDRESS GENERATOR, the COUNTER 56 being synchronised to zero by output 42 of BINARY-DECIMAL CONVERTER 43.

Each of the DIGIT STORES 0–7 of RECEIVE DIGITS STORE 26 has eight address inputs L to N and P to T, of which inputs L, M and N are the system number, and inputs P, Q, R, S and T are the channel number.

It will be seen in FIG. 5 that a portion only of LOGIC CIRCUIT 28 is shown, relating only to input L of the system address, and input P of the channel address in respect of DIGIT STORE O : it should be understood that a similar arrangement applies also to inputs M, N, Q, R, S and T, and also to each of the other DIGIT STORES 1–7.

The 8-bit serially-coded, 256 channels of eight incoming p.c.m. systems are stored in parallel in the RECEIVE DIGITS STORE 26, the eight outputs of which constitute the READ PARALLEL HW 27. Referring back to FIGS. 2 and 3, it is seen that the 8-t.d.m. path READ PARALLEL HW's 27 and 207 are cross-connected with 8-t.d.m. path WRITE PARALLEL HW's 30 and 300, each connected as inputs to an arrangement of SEND DIGIT STORES 31 and 301 and SEND CONVERSION UNITS 33 and 303, having as outputs 2-wire SEND HW's, such as 34 and 304 respectively. This arrangement operates in a manner similar to that already described relating to the RECEIVE side, but in the opposite mode, in that the WRITE and READ functions are reversed, so that an 8-bit parallel code from WRITE PARALLEL HW 30 is written into SEND DIGITS STORE 31 and converted by SEND CONVERSION UNIT 33 into an 8-bit serial code for transmission on a 2-wire SEND HW, such as 34. Only one ADDRESS GENERATOR 37, 307 is associated with each SEND DIGITS STORE 31, 301 as mentioned above, the reason for this being that each of the WRITE PARALLEL HW's 30, 300 is in frame alignment.

It will be remembered that the 2-wire REC. HW's 21 are delayed relative to each other before being applied to the SCANNING MATRIX 40, and therefore it is necessary to restore the 2-wire SEND HW's 0-7 (34, 304 etc.) into alignment, before they are applied to the SYSTEM CONTROLS 20. The SEND HW's accordingly include delay units in a manner similar to that shown in FIG. 4 for the RECEIVE HW's, but in reverse order, SEND HW O being delayed by 7-bits relative to SEND HWO, down to SEND HW 6 being delayed by 1-bit. (see also FIG. 11 described below).

In order to provide non-blocking switching, the READ and WRITE PARALLEL HW's are operated at twice the p.c.m. bit rate employed for the rest of the MSU. Thus the PARALLEL HW's operate at 4.096 MHz. with 512 channels per frame.

No such limitation is implied however. The PARALLEL HW's may be operated at the same bit-rate as the rest of the MSU (an arrangement of this type being described below with reference to FIGS. 9 and 10) or at any other suitable rate.

The selection of the two free common channels in the parallel highways, one for each direction of transmission between the RECEIVE DIGITS STORES and the SEND DIGITS STORES will now be described in more detail, relative to FIG. 7. For simplicity, the description will be restricted to the selection of two free common channels for one direction of transmission only (say, from RECEIVE DIGITS STORE 26 to SEND DIGITS STORE 303) and it will be understood that the selection of two free common channels for the other direction of transmission will be similar.

The CALL SET-UP UNIT 70 is associated, by means of allocation switches 71(*a*) and 71(*b*), with the STATE OF CHANNEL MEMORIES 201 and 308, and the INFORMATION ADDRESS MEMORIES 29 and 306, of the RECEIVE and SEND DIGITS STORES 26 and 303.

The STATE OF CHANNEL MEMORIES 201, 308 store '0' for a busy channel and '1' for a free channel.

The COMMON CONTROL (FIG. 2), via lead 76, stores the system and channel address of the calling channel (*x* of system A) in 9-bit SHIFT REGISTER 77 of the INFORMATION ADDRESS MEMORY 29 (8 bits for system and channel address, and 1 bit for state of channel), and via lead 78, the system and channel address of the called channel (*y* of system K) in 17-bit SHIFT REGISTER 79 of the INFORMATION ADDRESS MEMORY 306 (8 bits for system and channel address, 1 bit for state of channel, and 8 bits for crosspoint address).

It then instructs each of the STATE OF CHANNEL MEMORIES 201 and 308 to output their contents to the CALL SET-UP UNIT 70, where they are stored in 512-bit SHIFT REGISTERS 700 and 701 respectively, whose outputs are compared in gate 702. Coincident free channels are gated, through gate 703 by a coincident channel pulse from 9-bit SHIFT REGISTER 704 to lead 705 and, via allocation switch 71(*b*), are transmitted on lead 706 to 9-bit SHIFT REGISTER 707 associated with the RECEIVE DIGITS STORE 26, and also, via lead 708, to 9-bit SHIFT REGISTER 709 associated with the SEND DIGITS STORE 303. The coincident free channels applied to SHIFT REGISTER 707 are compared with the output of COUNTER 710 running in synchronism with the ADDRESS MEMORIES and, at coincidence in gate 711, the information held in REGISTER 77 is written into the INFORMATION ADDRESS MEMORY 29, and into STATE OF CHANNEL MEMORY 201. Similarly, the coincident channels via allocation switch 71(*b*) are applied on lead 708 to SHIFT REGISTER 709 where they are compared with COUNTER 712 running in synchronism with the ADDRESS MEMORIES, and at coincidence the information held in REGISTER 79 is written into the INFORMATION ADDRESS MEMORY 306, into STATE OF CHANNEL MEMORY 308 and into the XPT. ADDRESS MEMORY 309 of the SEND DIGITS STORE 303.

The logic circuit of a cyclic address generator, as shown in FIG. 5, will not be described in more detail. The system and channel number addresses for the RECEIVE DIGITS STORES are generated by means of these cyclic address generators, and the process is termed 'cyclic writing'. A similar arrangement applies for the SEND DIGITS STORES, except that the operation is reversed, i.e. 'cyclic reading'.

This is illustrated in FIG. 8, in which the READ ENABLE waveforms are shown at (a) applying to the RECEIVE DIGIT STORES, and at (b) applying to the SEND DIGIT STORES.

An example of the WRITING and READING operation will be explained for RECEIVE DIGITS STORE 26 (i.e. waveform 8(*a*) applies) with reference to FIG. 5.

With the output of the READ ENABLE waveform generator at 0, cyclic addressing takes place. The system number is connected to the system address inputs L to N of each DIGIT STORE 0–7 of RECEIVE DIGITS STORE 26 and one input of each of the channel number gates G5, G7 and G8 is enabled. The selection of channel number *x* or *x*-1 for a particular one of the DIGIT STORES 0–7 is determined by the outputs 53 and 55 of BINARY COUNTER 52 and SHIFT REGISTER 54, which are applied as inputs to the channel gates G8 and G7 respectively.

With the output of the READ ENABLE waveform generator at 1, cyclic addressing is inhibited and the READ address is connected to all DIGIT STORES.

A detailed operation of the logic circuitry will now be given, the circuit being in the form of positive logic NAND gates. It is convenient to refer to the more positive output voltage of gate as represented by logical 1, and the more negative output voltage as represented by logical 0.

Signal leads will be referred to in accordance with this nomenclature, in that for example, if the condition of data on a lead is as the result of logical 1, the lead will be designated as DATA, whereas if the condition is as a result of logical 0, the lead will be designated as $\overline{\text{DATA}}$.

For the purpose of this explanation, designate the data applied to leads of FIG. 5 as follows:

Lead L from BINARY COUNTER 56, as DATA 1
Lead 53 from BINARY COUNTER 52 as DATA 2
Lead 55 from BINARY COUNTER 54 as DATA 3
READ ADDRESS (CHANNEL NO.) input to G5 as DATA 4

READ ADDRESS (SYSTEM NO.) input to G2 as DATA 5
Output of SHIFT REGISTER 58 as SELECT
WRITE (cyclic addressing)
READ ENABLE (SYSTEM NO.) input to G2, G3 and G5 = 0 output of G2 and G3 = 1
Cyclic address applied to G4, G7 and G8
Input to G4 is DATA 1
Input to G7 is DATA 3
Input to G8 is DATA 2
Output of G4 is $\overline{\text{DATA 1}}$
Output of G2 is 1
Output of G1 is DATA 1, input to DIGIT STORES
Inputs to G7 are DATA 3, 1 from G3, and SELECT
Inputs to G8 are DATA 2, 1 from G3, and $\overline{\text{SELECT}}$
Inputs to G5 are DATA 4 and 0
Output of G5 = 1.
Case 1
SELECT = 1
Output of G7 = $\overline{\text{DATA 3}}$
Output of G8 = 1
Case 2
SELECT = 0
Output of G7 = 1
Output of G8 = $\overline{\text{DATA 2}}$
Therefore the output of G6 in,
Case 1 is DATA 3
Case 2 is DATA 2
READ
READ ENABLE (SYSTEM NO.)
input to G2, G3 and G5 = 1
output of G2 and G3 = 0
READ ADDRESS
input to G2 = DATA 5
output of G2 = $\overline{\text{DATA 5}}$
input to G4 = DATA 1
output of G4 = 0
output of G1 = DATA 5
READ ADDRESS (CHANNEL NO.) input to G5 = DATA 4

| | | | | |
|---|---|---|---|---|
| other | input to | G5 | = | 1 |
| | output of | G5 | = | $\overline{\text{DATA 4}}$ |
| | input to | G7 | = | 0 |
| | input to | G8 | = | 0 |
| | output of | G7 | = | 1 |
| | output of | G8 | = | 1 |
| | input to | G6 | = | $\overline{\text{DATA 4}}$, 1 and 1 |
| Therefore the | output of | G6 | = | DATA 4. |

FIG. 9 is a block schematic diagram of another form of MAIN SWITCHING UNIT which could be used in the telephone exchange system illustrated diagrammatically in FIG. 1. Many of the components of the UNIT illustrated in FIG. 9 correspond to components of the UNIT illustrated in FIGS. 2 and 3 and carry the same reference numerals: reference may, accordingly, be made to the preceding description for further information concerning these components, if required.

FIG. 9 shows the 2-wire RECEIVE HW 21 of one of eight p.c.m. systems 0 to 7 connected, through a respective LINE CONVERTOR and CLOCK EXTRACTOR 91, a BIT ALIGNER 92 and SLOT ALIGNER 93 to a RECEIVE MODULE 95 (*i*). It will be understood that the RECEIVE HW's 21 of the other seven of the p.c.m. systems 0 to 7 are also connected in a similar manner to the RECEIVE MODULE 95(*i*), as indicated in FIG. 10 which shows the RECEIVE MODULE in greater detail.

The RECEIVE MODULE 95 (*i*) includes a RECEIVE CONVERSION UNIT 22 comprising DELAY UNITS $\mathbf{45_0}$ . . . . . . $\mathbf{45_7}$, and a series/parallel conversion means comprising serial-parallel convertors $\mathbf{94_0}$ . . . . . . . . $\mathbf{94_7}$ and input speech multiplexors $\mathbf{96_0}$. . . . . . . $\mathbf{96_7}$ (FIG. 10). The serial-parallel convertors 94 are eight-bit shift registers and the outputs of the registers are multiplexed together by the multiplexors 96 so that, as in FIGS. 2 and 3, the serially-disposed digits of each input channel into parallel form on eight outputs 25. As already mentioned with reference to FIG. 6, there is read out, on the output wires 25, a different digit of the eight p.c.m. systems. The outputs 25 of the RECEIVE CONVERSION UNIT 22 are connected, as in FIGS. 2 and 3, as inputs to a RECEIVE DIGITS STORE 26 which comprises eight parallel stores 50 as in FIG. 5, each store having a capacity of 256 bits. The STORE 26 constitutes a random access memory having a unique storage location for each of the 256 digits of the eight p.c.m. systems, thereby providing full availability. The output of the RECEIVE DIGITS STORE 26 constitutes the output of the RECEIVE MODULE 95(*i*) and as in FIGS. 2 and 3, comprises eight parallel paths (shown in FIG. 9 as a READ PARALLEL HW 27) and the eight-path READ PARALLEL HW 27 is cross-connected in a SPACE SWITCH 105 with a similar eight-path WRITE PARALLEL HW 30. However in FIG. 9 the READ PARALLEL HW 27 is common (as indicated) to (or, in other words, constitutes the output of) a second RECEIVE MODULE 95(*ii*) (not shown) which is identical in all respects to the RECEIVE MODULE 95(*i*). Two groups of eight p.c.m. systems (i.e. 512 channels) are thus brought together on the READ PARALLEL HW 27 so that the switching between the PARALLEL HW's 27 and 30 is now subject to blocking. It is envisaged, however, that in practice the amount of blocking would be small.

The WRITE PARALLEL HW 30 is common, in a similar manner, to two identical SEND MODULES 97(*i*) and 97(*ii*) only one (97(*i*)) of which is shown in FIG. 9. The SEND MODULE 97 includes a SEND DIGITS STORE 31, similar to the RECEIVE DIGITS STORE 26, and comprising eight parallel stores 500 (FIG. 11) each having a capacity of 256 bits. The STORE 31 constitutes a random access memory having a unique storage location for each of the 256 digits of the eight p.c.m. systems, thereby providing full availability. The eight output paths of the SEND DIGITS STORE 31 are connected to a SEND CONVERSION UNIT 33 comprising a parallel/series conversion means (eight output speech demultiplexors $\mathbf{960_0}$ . . . . . . $\mathbf{960_7}$ and eight parallel-serial convertors $\mathbf{940_0}$ . . . . $\mathbf{940_7}$ in the form of 8-bit shift registers and DELAY UNITS $\mathbf{450_0}$ . . . . . $\mathbf{450_7}$ (FIG. 11). The read-out on the eight output paths of the STORE 31 comprises, at any instant, a different digit of each of the eight p.c.m. systems as already explained with reference to FIG. 6 and SEND CONVERSION UNIT 33 converts a parallel-stored eight-bit code into a code in serial form on the 2-wire SEND H.W. of one of eight p.c.m. systems.

Associated with the RECEIVE DIGITS STORE 26 and forming part of the RECEIVE MODULE 95(*i*) are a LOGIC CIRCUIT 28 and eight CYCLIC ADDRESS GENERATORS 200 (see FIG. 10 and also FIG. 5), each of the GENERATORS having an input from a respective SLOT ALIGNER 93.

Associated with the SEND DIGITS STORE 31, in similar manner, and forming part of the SEND MODULE 97(*i*) is a LOGIC CIRCUIT 35 but only one CYCLIC ADDRESS GENERATOR 37 for a reason which will be described below.

A single CALL CONTROL UNIT 90 (FIG. 9) is associated with both of the RECEIVE MODULES 95(*i*) and 95(*ii*), and with both of the SEND MODULES 97(*i*) and 97(*ii*). The CALL CONTROL UNIT 90 comprises an INFORMATION ADDRESS MEMORY 29 and STATE OF CHANNEL MEMORY 201 which are associated with the RECEIVE DIGITS STORE 26, and a second INFORMATION ADDRESS MEMORY 36 and a second STATE OF CHANNEL MEMORY 38 which are associated with the SEND DIGITS STORE 31.

The CALL CONTROL UNIT 90 is in both way communication with a CALL SET-UP UNIT 70 and a COMMON CONTROL 24.

In general, the functions of the various components of FIG. 9 are the same as those of the corresponding components in FIGS. 2 to 4 and 7 and will not be described in detail. Some modifications are, of course, necessary in view of the fact that the READ PARALLEL HW 27 and the WRITE PARALLEL HW 30 are common to two groups of eight p.c.m. systems and these modifications will be apparent from the following description of the operation of the SWITCHING UNIT shown in FIG. 9.

The READ ENABLE waveforms applying to the RECEIVE and SEND DIGITS STORES 26 and 31 are as shown in FIG. 8(*a*) and (*b*) respectively: that is, for the RECEIVE DIGITS STORE 26 there are one "write" period and two "read" periods for each of the 256 time slots in one frame of 125 micro-seconds while, for the SEND DIGITS STORE 31 the operations are reversed.

Taking the RECEIVE DIGITS STORE 26 as an example, during the "write" periods, the operation described above as "cyclic writing" takes place: that is, the RECEIVE DIGITS STORE 26 is provided with an eight-bit address by the appropriate one of the CYCLIC ADDRESS GENERATORS 200 via the logic circuit 28. As described above with reference to FIG. 5, each CYCLIC ADDRESS GENERATOR Includes a 5-bit synchronous counter (shown in FIG. 5 at 52) which is clocked at the p.c.m. slot rate and is reset by a signal from the SLOT ALIGNER 93. The 5-bit synchronous counter provides the channel number of the p.c.m. system to which it relates, and the remaining three bits of the eight-bit address (which constitute the system number) are provided by a 3-bit binary counter (shown in FIG. 5 at 56).

As a more specific example of the operation of 'cyclic writing', consider the case of channel 5 of p.c.m. system 7. One of the CYCLIC ADDRESS GENERATORS 200 is in frame alignment with the slot-aligned p.c.m. system 7, and at the instant (during a "write" period) when channel 5 of this system is fully-contained within the shift register 94$_7$, binary 7 (i.e. 111) is applied to the input speech multiplexors 96$_0$ . . . . . 96$_7$, thereby presenting channel 5 of system 7 to the RECEIVE DIGITS STORE 26. Simultaneously, binary 7 is also applied to the LOGIC CIRCUIT 28 causing the contents of the appropriate CYCLIC ADDRESS GENERATOR 200 (i.e. 7 and 5) to be applied to the address inputs (shown in FIG. 5 as L to N and P to T) of the RECEIVE DIGITS STORE 26 so that channel 5 of system 7 is stored in location 111 00101.

The information written into the RECEIVE DIGITS STORE 26 is stored for up to one frame and may be read out during the acyclic periods of that frame in any one of the 512 time slots and passed to the READ PARALLEL HW 27. During this operation (referred to above as 'acylic reading') an acylic address is provided by the CALL CONTROL UNIT 90 and is applied to all of the associated DIGIT STORES. Since the two SEND MODULES 97(*i*) and 97(*ii*) do not operate independently during the "read" periods of FIG. 8*a*, the acyclic address includes an additional bit, compared with the unit of FIGS. 2 and 3, to determine which of the two SEND MODULES is to be used.

The 'read' and 'write' operations associated with SEND DIGITS STORE 31 are generally similar to those described above, but are reversed. However, the WRITE PARALLEL HW's 30 are in frame alignment so that only one CYCLIC ADDRESS GENERATOR 37 is required in association with the SEND DIGITS STORE 31, together with a simplified form of LOGIC CIRCUIT 35.

During the 'write' periods of FIG. 8*b* the acyclic address provided by the CALL CONTROL UNIT 90 is applied to the LOGIC CIRCUIT 35.

During the 'read' periods of FIG. 8*b*, the CYCLIC ADDRESS GENERATOR 37 provides addresses which cause all information relating to a particular time slot (i.e. channel) to be read out of the SEND DIGITS STORE 31 in ascending order of system number. The CYCLIC ADDRESS GENERATOR 37 comprises an 8-bit synchronous counter clocked at the p.c.m. slot rate, with the three least significant bits providing the system number and the five most significant bits providing the time slot (channel) number.

During time slot 0 in alternate frames, the outputs of the SEND DIGITS STORE 31 are inhibited and the frame sync. pattern is inserted by a SYNC. INSERTION UNIT 99. That is, the MAIN SWITCHING UNIT of FIG. 9 defines time slot 0 on its SEND p.c.m. systems.

The output of the SEND DIGITS STORE 31, which is in the form of parallel 8-bit words is demultiplexed and converted into serial form by the SEND CONVERSION UNIT 33, and the staggering of the bits produced by the parallel multiplexing process is then removed by the delay units 450 (FIG. 11) which are applied in reverse order to the corresponding receive delay units 45 of FIG. 10. The outputs of the delay units 450 are then in frame alignment and are passed to a LINE CONVERTOR 100 (9) and then to line.

A SYNC. CODE CHECKER 101 and two PARITY GENERATOR CHECKERS 102, 103 are included in the UNIT of FIG. 9 to provide monitoring checks, but are not essential components.

During free internal time slots, the locations corresponding (in the RECEIVE DIGITS STORES 26 of the two RECEIVE MODULES 95(*i*) and 95(*ii*)) to the time slots 0 are successively addressed and the sync. code (frame alignment pattern) which occurs in alternate frames is read out to the SYNC CODE CHECKER 101. This provides some check that the RECEIVE DIGITS STORES 26 are functioning (although not necessarily in all locations) and that the preceding transmission paths are transparent.

While information is being written into the RECEIVE DIGITS STORES 26, the SPACE SWITCH 105 is effectively idle, since simultaneous reading and writing is not possible. As a result, 256 time slots/frame exist in the SPACE SWITCH 105, which can be used for internal signalling and data transfer purposes: these signalling slots may, for example, be used to transmit (among other things) a parity bit for the previous speech slots. In the UNIT shown in FIG. 9, parity bits for the odd and even speech slots are generated in the odd and even frames respectively. More particularly, during the signalling slots in the odd frames, the PARITY CHECKER 103 on the output side of the SPACE SWITCH 105 causes the space-switch cross points which are operated during the previous odd speech slots to be reoperated. A parity bit is generated and is compared with the parity bit generated in the succeeding "odd" signalling slot. A similar process occurs during the even frames for the even speech slots. The PARITY CHECKER 102 on the input side of the space switch 105 operates in a similar manner.

It will be appreciated that a SYNC. CODE CHECKER 101 and PARITY GENERATOR CHECKERS 102, 103 could be employed in a similar manner in the UNIT shown in FIGS. 2 and 3.

I claim:

1. A time division multiplex digital switching network comprising, in combination a plurality of pulse code modulated communication systems each comprising a plurality of channels, with a plurality of serial digits per channel, each system having an input highway and an output highway, a receive conversion unit to which the plurality of input highways are connected, said receive conversion unit comprising a plurality of receive delays, there being for each input highway, a respective unique receive delay which may be zero and to which the input highway is connected, and a series/parallel conversion means to which the outputs of said receive delays are connected, for converting the serial digits of the channels of said input highways into parallel form on a plurality of outputs of said series/parallel conversion means, first storage means to which the plurality of outputs of said series/parallel conversion means are connected, for storing in parallel the serial digits of the channels of the input highways, second storage means having a plurality of inputs and a plurality of outputs, switchable t.d.m. connection means for interconnecting outputs of the first storage means with inputs of the second storage means, a send conversion unit comprising a parallel/series conversion means to which the outputs of the second stage means are connected, and a plurality of send delays, there being, for each output highway, a respective unique send delay, which may be zero and to which an output of said parallel/series conversion means is connected, for converting parallel digital information on the outputs of said second storage means into serial form on any one of a plurality of outputs of said send delays, each output highway being connected to the output of the respective send delay, control means for operating said connection means to establish a desired connection between a channel of an input highway and a channel of an output highway by reading-out in parallel from the first storage means the digits of the said input channel at a time allocated by said connection means and writing-in said read-out in parallel into the second storage means at the said allocated time.

2. A network as claimed in claim 1, having at least one pair of first storage means the outputs of which are common and at least one pair of second storage means the inputs of which are common.

3. A network as claimed in claim 1, including for each first storage means, an address generator operable to generate a respective address for each input channel of said first storage means and to apply the address to the first storage means to write-in, in parallel, the serial digits of the channel.

4. A network as claimed in claim 1, including, for each second storage means, an address generator operable to generate a respective address for each output channel of said second storage means and to apply the address to the second storage means to read out, in series, the parallel-stored digits of the channel.

5. A network as claimed in claim 1, in which the control means includes a common control connected to receive information from a channel of an input highway relating to a desired connection to be established between that channel and a channel of an output highway.

6. A network as claimed in claim 5, in which the control means includes a call set-up unit operable to test for and allocate in said t.d.m. connection means a free channel necessary to establish the said desired connection, and then to apply addresses to the first and second storage means to read-out from the first storage means the digits of said channel of an input highway and to write-in said read-out into the second storage means.

7. A network as claimed in claim 5, in which the control means includes, for the first and second storage means, at least one respective information address memory, in bothway communication with the common control, for storing the address of each operational location of the storage means.

8. A network as claimed in claim 5, in which the control means includes, for the first storage means, at least one state of channel memory, in bothway communication with the common control, for storing the state of each input channel of said t.d.m. connection means.

9. A network as claimed in claim 5, in which the control means includes, for the second storage means, at least one state of channel memory, in bothway communication with the common control, for storing the state of each output channel of said t.d.m. connection means.

10. A network as claimed in claim 5 in which the t.d.m. connection means is a cross-point matrix and the control means includes, for the second storage means, at least one second address memory, in both way communication with the common control, for receiving information relating to the interconnections required between outputs of the first storage means and inputs of the second storage means to establish a desired connection between an input channel and an output channel.

11. A network as claimed in claim 1, in which the receive delays comprise delays of 0 to $(n_1-1)$ bits to which the input highways of p.c.m. systems 0 to $(n_1-1)$ respectively are connected, and the series/parallel conversion means has $n_1$ outputs on which are read out in parallel, at any instant, a different digit from each of the $n_1$ systems.

12. A network as claimed in claim 11, in which the first storage means has a unique storage location for each of the $mp$ digits of the $n_1$ systems ($m$ being the number of channels in each system and $p$ being the number of digits per channel).

13. A network as claimed in claim 1, in which the parallel/series conversion means has $n_2$ inputs into which are written in parallel, at any instant, a different digit from each of $n_2$ p.c.m. systems, and the send delays comprise delays of ($n_2$−1) to 0 bits to which the output highways of p.c.m. systems 0 to ($n_2$−1) respectively are connected.

14. A network as claimed in claim 13, in which the second storage means has a unique storage location for each of the $mp$ digits of the $n_2$ systems ($m$ being the number of channels in each system and $p$ being the number of digits per channel).

15. A network as claimed in claim 1, in which said series/parallel conversion means comprises a single scanning matrix the outputs of which are a plurality of separate wires, and a scan generator for reading out at any instant, on said separate wires, a different digit from each of said p.c.m. systems.

16. A network as claimed in claim 1, in which said series/parallel conversion means comprises a plurality of shift registers, and multiplexor means to which the outputs of the shift registers are connected.

17. A network as claimed in claim 1, in which said first storage means comprises, for each output of said series/parallel conversion means, a respective parallel digit store.

18. A network as claimed in claim 1, in which said parallel/series conversion means comprises demultiplexor means and a plurality of shift registers to which the outputs of the demultiplexor means are connected.

19. A time division multiplex communication system comprising in combination a plurality of incoming pulse code modulated communication systems each comprising a plurality of channels, with a plurality of serial digits per channel, each system having an input highway, a plurality of outgoing pulse code modulated communication systems each having an output highway, and a receive conversion unit interconnected between said highways, said unit comprising, for each input highway a respective unique receive delay which may be zero and to which the input highway is connected, and a series/parallel conversion means to which the outputs of said receive delays are connected, for converting the serial digits of each channel of said input highways into parallel form on a plurality of outputs of said series/parallel conversion means.

20. A time division multiplex communication system comprising in combination a plurality of incoming pulse code modulated communication systems each comprising a plurality of channels, with a plurality of serial digits per channel, each system having an input highway, a plurality of outgoing pulse code modulated communication systems each having an output highway, and a send conversion unit interconnected between said highways, said unit comprising a parallel/series conversion means having a plurality of inputs for receiving in parallel form the digits of the channels of said input highways and, for each output highway, a respective unique send delay which may be zero and to which the output highway is connected, for converting parallel digital information on the inputs of said parallel/series conversion means into serial form on one of said output highways.

21. A time division multiplex communication system comprising in combination a plurality of incoming pulse code modulated communication system each comprising a plurality of channels, with a plurality of serial digits per channel, each system having an input highway, a plurality of outgoing pulse code modulated communication systems each having an output highway, and receive and send conversion units interconnected between said highways, said receive conversion unit comprising, for each input highway, a respective, unique receive delay which may be zero and to which the input highway is connected and a series/parallel conversion means to which the outputs of said receive delays are connected, for converting the serial digits of each channel of said input highways into parallel form on a plurality of outputs of said series/parallel conversion means, and said send conversion unit comprising a parallel/series conversion means having a plurality of inputs for receiving in parallel form, the digits of the channels of said input highways, and for each output highway, a respective unique send delay which may be zero and to which the output highway is connected, for converting parallel digital information on the inputs of said parallel/series conversion means into serial form on one of said output highways.

22. A system as claimed in claim 21, in which the receive delays comprise delays of 0 to ($n_1$−1) bits to which the input highways of p.c.m. systems 0 to ($n_1$−1) respectively are connected, and the series/parallel conversion means has $n_1$ outputs on which are read out in parallel, at any instant, a different digit from each of the $n_1$ systems.

23. A system as claimed in claim 21, in which the parallel/series conversion means has $n_2$ inputs into which are written in parallel, at any instant, a different digit from each of $n_2$ p.c.m. systems, and the send delays comprise delays of ($n_2$−1) to 0 bits to which the output highways of p.c.m. systems 0 to ($n_2$−1) respectively are connected.

24. A system as claimed in claim 21, in which said series/parallel conversion means comprises a single scanning matrix, the outputs of which are a plurality of separate wires, and a scan generator for reading out at any instant, on said separate wires, a different digit from each of said p.c.m. systems.

25. A system as claimed in claim 21, in which said series/parallel conversion means comprises a plurality of shift registers, and multiplexor means to which the outputs of the shift registers are connected.

* * * * *